United States Patent
Kruglick

(10) Patent No.: US 8,997,179 B2
(45) Date of Patent: Mar. 31, 2015

(54) SHARED SECRET IDENTIFICATION FOR SECURE COMMUNICATION

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 121 days.

(21) Appl. No.: 13/816,717

(22) PCT Filed: Sep. 26, 2012

(86) PCT No.: PCT/US2012/057219
§ 371 (c)(1),
(2) Date: Feb. 12, 2013

(87) PCT Pub. No.: WO2014/051558
PCT Pub. Date: Apr. 3, 2014

(65) Prior Publication Data
US 2014/0090016 A1   Mar. 27, 2014

(51) Int. Cl.
*G06F 7/04* (2006.01)
*H04L 29/06* (2006.01)
*H04W 12/02* (2009.01)

(52) U.S. Cl.
CPC ............... *H04L 63/08* (2013.01); *H04W 12/02* (2013.01)
USPC ................ 726/3; 713/176; 713/181; 707/698

(58) Field of Classification Search
USPC .................. 726/3; 713/176, 181; 707/698
See application file for complete search history.

(56) References Cited

U.S. PATENT DOCUMENTS

| 7,380,138 B2 * | 5/2008 | Chen et al. ..................... 713/193 |
| 7,657,928 B2 * | 2/2010 | Shima et al. ...................... 726/3 |
| 7,809,685 B2 * | 10/2010 | Wolff ............................ 707/648 |
| 8,560,849 B2 * | 10/2013 | Machani et al. .............. 713/168 |
| 8,566,696 B1 * | 10/2013 | Hamon et al. ................. 715/205 |
| 8,656,166 B2 * | 2/2014 | Jacobs ........................... 713/169 |
| 2008/0281908 A1 | 11/2008 | McCanne et al. |
| 2009/0034715 A1 | 2/2009 | Ramasamy et al. |
| 2009/0268903 A1 | 10/2009 | Bojinov et al. |

(Continued)

FOREIGN PATENT DOCUMENTS

WO    PCT/US12/57219    9/2012

OTHER PUBLICATIONS

J. Preshing; Internet article: http://preshing.com/20110504/hash-collision-probabilities, May 4, 2011.

(Continued)

*Primary Examiner* — Amare F Tabor
(74) *Attorney, Agent, or Firm* — Jensen & Puntigam, PS

(57) ABSTRACT

Technologies related to shared secret identification for secure communication are generally described. In some examples, devices may exchange hashes, such as file deduplication hashes, to identify a matching hash. The identified matching hash represents a shared data item which may be used as a shared secret to encrypt and/or decrypt subsequent secure communications between the devices. Each device retrieves the shared data item from its respective secure memory and may use the shared data item to encrypt and/or decrypt subsequent secure communications. An eavesdropper may observe the hash exchange, but will not be able to decrypt the secure communications without access to the shared data item, because hashes may be effectively non-invertible.

24 Claims, 6 Drawing Sheets

(56) References Cited

U.S. PATENT DOCUMENTS

| | | |
|---|---|---|
| 2010/0017615 A1 | 1/2010 | Boesgaard Sorensen |
| 2010/0088517 A1 | 4/2010 | Piersol |
| 2011/0055471 A1 | 3/2011 | Thatcher et al. |
| 2011/0103580 A1 | 5/2011 | Hazay et al. |
| 2011/0238989 A1 | 9/2011 | Machani et al. |
| 2011/0286584 A1 | 11/2011 | Angel et al. |

OTHER PUBLICATIONS

Q. Zheng and S. Xu, "Secure and Efficient Proof of Storage with Deduplication", eprint.iacr.org, Feb. 7, 2012.

International Searching Authority, International Search Report and Written Opinion of the International Searching Authority for PCT/US12/57219, Nov. 23, 2012.

G. Simmons; "Prepositioned Shared Secret and/or Shared Control Schemes"; in Advances in Cryptology—EUROCRYPT89; (Springer 1990), 436-467.

D. Catalano et al., "Computing inverses over a shared secret modulus," in Advances in Cryptology—Eurocrypt 2000 (Springer, 2000), 190-206.

J. Algesheimer et al., "Efficient computation modulo a shared secret with application to the generation of shared safe-prime products," Advances in Cryptology—CRYPTO 2002 (2002): 417-432.

Wikipedia, internet article: http://en.wikipedia.org/wiki/Data_deduplication, Jan. 28, 2013.

Wikipedia, internet article: http://en.wikipedia.org/wiki/Hash_chain, Jan. 28, 2013.

J. Pershing; Internet article: http://preshing.com/20110504/hash-collision-probabilities, May 4, 2011.

M. Lillibridge et al., "Sparse indexing: large scale, inline deduplication using sampling and locality," in Procedings of the 7th conference on File and storage technologies (USENIX Association, 2009), 111-123.

D. Geer, "Reducing the storage burden via data deduplication," Computer 41, No. 12 (2008): 15-17.

Q. Zeng and S. Xu, "Secure and Efficient Proof of Storage with Deduplication" (n.d.)., eprint.iacr.org.

J. Kim et al., "Deduplication in SSD for Reducing Write Amplification Factor", n.d., usenix.org.

S. Katzenbeisser and F. Petitolas, "Information Hiding Techniques for Steganography and Digital Watermaking" (2000)—summary and comments from www.amazon.com/Information-Techniques-Steganography-Digital-Watermarking, accessed on Jan. 30, 2013.

T. Wood et al. "Memory Buddies: Exploiting Page Sharing for Smart Colocation in Virtualized Data Centers." In Proceedings of the 2009 ACM SIGPLAN/SIGOPS International Conference on Virtual Execution Environments, 31-40. ACM, 2009.

burtleburtle.net, "Secure Key Exchange with Hashing and the Birthday Paradox," internet article: burtleburtle.net/bob/crypto/exchange.html, May 23, 2012.

\* cited by examiner

SHARED SECRET IDENTIFICATION FOR SECURE COMMUNICATION

CROSS-REFERENCE TO RELATED APPLICATIONS

The present application is a U.S. national stage filing under 35 U.S.C. §371 of International Application No. PCT/US2012/57219, entitled "SHARED SECRET IDENTIFICATION FOR SECURE COMMUNICATION", filed on Sep. 26, 2012, the entire contents of which are incorporated herein by reference.

BACKGROUND

Unless otherwise indicated herein, the materials described in this section are not prior art to the claims in this application and are not admitted to be prior art by inclusion in this section.

Electronic communications frequently take place over insecure communication channels. Insecure communication channels may include wired and wireless channels as well as encrypted and unencrypted channels. So-called "open", or unencrypted Wi-Fi networks are often insecure, however, even "security-enabled" Wi-Fi networks, in which wireless transmissions are encrypted, are vulnerable to attacks such as the so-called "man in the middle" attack. Cellular communication networks can also be insecure. For example, third parties may set-up "fake" or unauthorized cellular communication stations that capture and forward cellular communication data. In general, a wide variety of eavesdropping activities may take place within any network infrastructure.

Secure communication may include exchanging information with varying degrees of certainty that third parties cannot intercept and/or decrypt it. Secure communication methods may use shared secrets, for example, as described in G Simmons, "Prepositioned Shared Secret and/or Shared Control Schemes," Advances in Cryptology—Eurocrypt 1989 (Springer, 1990): 436-467; and D. Catalano, R. Gennaro, and S. Halevi, "Computing Inverses Over a Shared Secret Modulus," Advances in Cryptology—Eurocrypt 2000 (Springer, 2000): 190-206. Shared secrets present a powerful secure communication tool allowing, for example, parties in possession of a shared secret to encrypt and decrypt data using the shared secret, while any party not having the shared secret cannot decrypt intercepted data. However, initially establishing the shared secret, without also providing the shared secret or information that may be used to ascertain the shared secret to would-be eavesdroppers can present security vulnerability in some scenarios.

SUMMARY

The present disclosure generally describes technologies including devices, methods, and computer readable media relating to shared secret identification for secure communication. Some example methods may comprise sending by a computing device to a communication target hashes of data items stored in a secure memory location accessible by the computing device; receiving, by the computing device, an identified hash from among the hashes sent by the computing device, wherein the identified hash indicates that the communication target has access to a data item corresponding to the identified hash in a secure memory location accessible by the communication target; and encrypting or decrypting, by the computing device, a subsequent communication with the communication target using the shared data item as a shared secret.

Some example methods may comprise receiving, by a computing device, hashes of data items stored in a secure memory location accessible by a communication target; comparing, by the computing device, the received hashes to hashes of data items stored in a secure memory location accessible by the computing device, to identify a hash, wherein the identified hash indicates that the computing device has access to a data item corresponding to the identified hash in a secure memory location accessible by the computing device; sending, by the computing device, the identified hash to the communication target; and encrypting or decrypting, by the computing device, a subsequent communication with the communication target using the data item corresponding to the identified hash as a shared secret.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may include a server comprising a processor, a memory, and a shared secret identification system configured to carry out the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
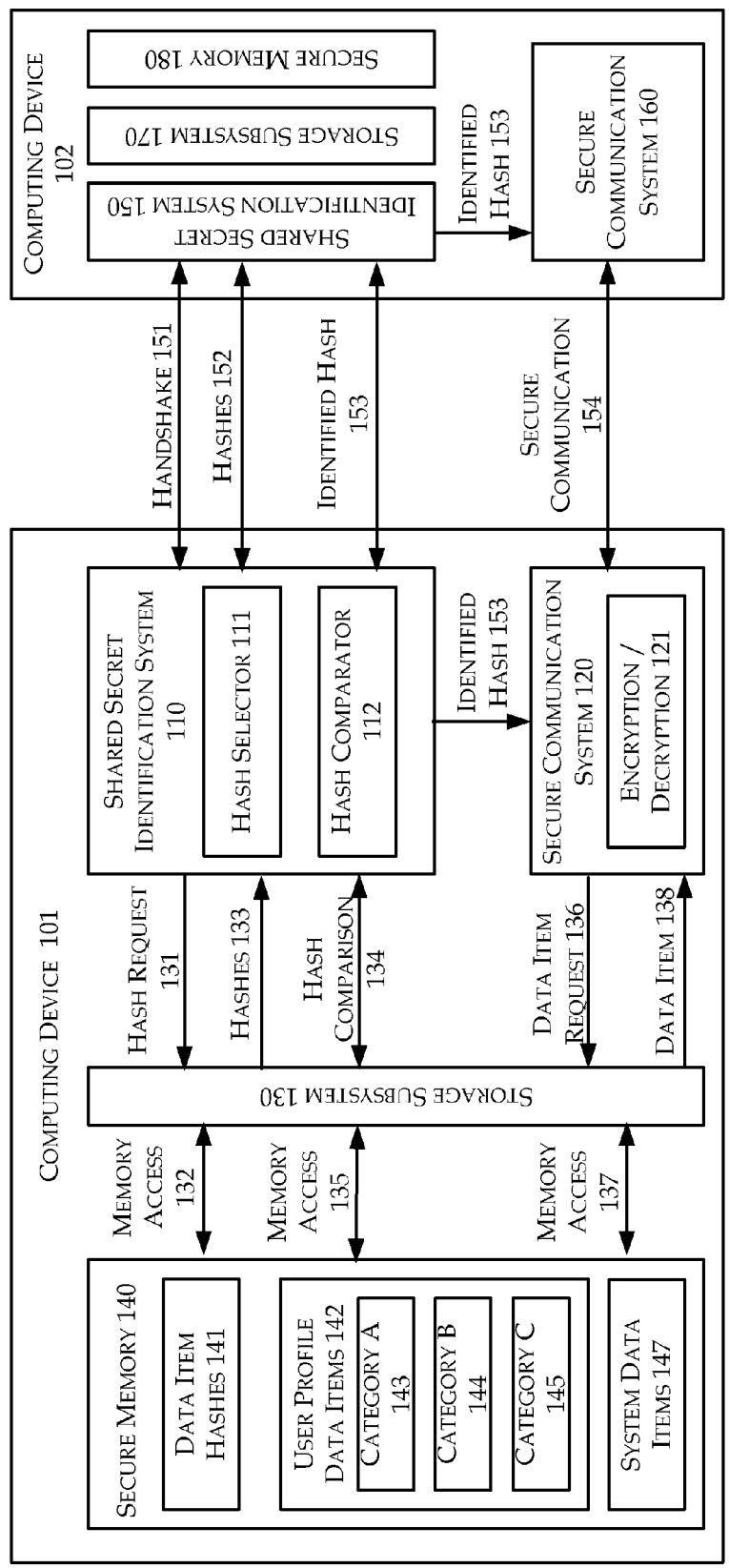
FIG. 1 is a block diagram illustrating example computing devices engaging in shared secret identification for secure communication.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to shared secret identification for secure communication. In some examples, devices may exchange hashes, such as file deduplication hashes, to identify a matching hash. The identified matching hash represents a shared data item which may be used as a shared secret to encrypt and/or decrypt subsequent secure communications between the devices. Each device may retrieve the shared data item from its respective secure memory and may use the shared data item to encrypt and/or decrypt subsequent secure communications. An eavesdropper may observe the hash exchange, but will not be able to decrypt the secure communications without access to the shared data item, because the exchanged hashes may be effectively non-invertible.

For example, in some embodiments, a first computing device may be configured to send hashes of data items stored in a secure memory location accessible by the first computing device to a second computing device. In this example, the second computing device may be referred to as a communication target. The first computing device may be configured to receive an identified hash from the communication target, wherein the identified hash may correspond to a data item shared by both devices. The identified hash may also be referred to herein as a matching hash, and the corresponding data item may be referred to herein as a shared data item. The first computing device may be configured to use the shared data item or an aspect thereof as a shared secret to encrypt and/or decrypt subsequent secure communications with the communication target.

In some embodiments, the second computing device may be configured to receive hashes from the first computing device. In this example, the first computing device may be referred to as the communication target. The second computing device may be configured to compare received hashes to hashes of data items stored in a secure memory location accessible by the second computing device to identify a matching hash indicating access to a shared data item. The second computing device may be configured to send the identified hash to the communication target and to use the corresponding shared data item or an aspect thereof as a shared secret to encrypt and/or decrypt subsequent secure communications with the communication target.

In some embodiments, the first and second computing devices may be configured to simultaneously or alternately send and receive, i.e., to exchange hashes, and to compare received hashes to hashes of data items stored in their respective secure memory locations. A computing device which first identifies a matching hash indicating possession of a shared data item (which may be either the first or the second computing device) may send the identified hash to the other computing device. The first and second computing devices may be configured to initiate secure communications by encrypting and decrypting communications using the shared data item corresponding to the identified hash as a shared secret.

In some embodiments, exchanged hashes may comprise storage system deduplication hashes of data items stored in local memories of computing devices. Deduplication hashes may comprise highly compressed signatures generated for storage blocks to detect blocks that contain identical data and enable representation by references instead of multiple copies of identical data. Deduplication hashes may be effectively non-invertible, meaning that it may be impossible to unambiguously generate an original data item from a deduplication hash. Deduplication hashes may be produced using any hash function, as will be appreciated. In general, hash functions for deduplication or otherwise may comprise any algorithm that maps larger data sets (e.g. data items) of variable length to smaller data sets (e.g., hashes) of a fixed length. A hash, whether a deduplication hash or otherwise, may comprise, e.g., a 32 or a 64 bit integer, although hashes may take numerous forms and this disclosure is not limited to any particular hash type. Data deduplication is generally a data compression technique that reduces or eliminates duplicate copies of repeating data. Deduplication hashes may be used to reduce storage utilization and can also be applied to network data transfers, e.g., to reduce the number of bytes that must be sent. In an example deduplication process, unique data items or portions thereof, e.g., unique byte patterns within data items, may be identified and stored. Other data items may be compared to the stored data items and whenever a match occurs, redundant data items may be replaced with a pointer that points to the stored data item. Given that a same byte pattern may occur very many times, deduplication can greatly reduce the amount of data that is stored or transferred by computing devices.

In some embodiments, computing devices may be configured to select hashes for exchange. A variety of hash selection techniques are described herein, any of which may be used alone or in combination with other hash selection techniques. In some embodiments, hashes of data items exchanged by computing devices may comprise hashes of user profile data items, such as e-mails, text files, image files, social data (e.g., data shared via a social network), or portions thereof. In some embodiments, hashes of data items sent by computing devices may comprise hashes of system data items, such as operating system files, application files, or portions thereof. In some embodiments, hashes of data items sent by computing devices may comprise hashes of data items with sharing histories, as described in further detail herein.

Hash selection may be configured to balance security against speed and convenience as desired for particular embodiments. For example, the use of system data items as shared secrets may generally provide a high level of speed and convenience in identifying shared secrets, while the use of system data items may provide a lower level of security compared to user profile data items, due to the availability of identical sets of system data items in many devices. For example, system data items associated with any of the popular WINDOWS®, ANDROID®, and IOS® families of operating systems are widespread. Because system data items may be ubiquitous, in some embodiments computing devices may be configured to exchange hashes of system data items for comparatively high levels of convenience and speed of shared secret identification.

In contrast, user profile data items, such as shared text messages or e-mails between users of computing devices, may generally be more unique and less likely to be accessible to would-be eavesdroppers. In some embodiments, computing devices may therefore be configured to attempt to identify user profile data items as shared secrets, by exchanging hashes of user profile data items, to provide comparatively strong security. However, identification of shared user profile data items may involve some additional information exchange between devices, additional hash selection processing operations, and/or user directed hash selection operations in some embodiments. Computing devices may be configured to exchange hashes of user profile data items for comparatively high levels of communication security.

Furthermore, in some embodiments, computing devices may be configured to exchange hashes of both user profile data items and system data items. For example, computing devices may be configured to exchange hashes of user profile data items first, and to exchange hashes of system data items if no shared user profile data item can be identified. In some embodiments, computing devices may be configured to detect when shared user profile data items may be available, for example by establishing a user or a device identifier of a communication target, and determining whether there exists any history of communications with the user and/or the communication target device. Computing devices may be configured to perform hash selection for shared secret identification using hashes of user profile data items when there is a history of communications with the user and/or the communication target device, and to perform hash selection for shared secret identification using hashes of system data items when there is no history of communications with the user and/or the communication target device. It will be appreciated that numerous other hash selection approaches and/or or modifications to hash selection techniques described herein may be made with the benefit of this disclosure.

In some embodiments, computing devices may be configured to select hashes for exchange for example by identifying a user associated with a communication target and identifying data items with sharing histories involving the user associated with the communication target. The hashes of data items exchanged by computing devices may comprise hashes of the data items with sharing histories involving the user associated with the communication target. In some embodiments, user and/or data item identification may be accomplished in part through interaction with a social networking application, social networking Application Programming Interface (API), or with available social networking data, which may include likely contacts of a user of a computing device as well as identifications of shared data items.

In some embodiments, computing devices may be configured to prioritize hashes selected for exchange based on uniqueness/rarity of corresponding data items. For example, hashes corresponding to more "rare" data items may be selected for exchange either before or after hashes corresponding to less rare data items, to adjust security strength against probable speed of identifying a matching hash. Hashes of data items that tend to be more rare or unique may comprise user profile data items such as e-mail exchanges between communicating parties and corporate documents created by one of the communicating parties. Hashes of data items that tend to be less rare or unique may comprise system data items such as application code regions and operating system files. In some embodiments, computing devices may be configured to sort data items in order of decreasing security and select hashes of data items based on such prioritization. For example, an e-mail between two communicating parties may be more secure than an e-mail sent company-wide; an image shared by few may be more secure than an image shared on a social network such as FACEBOOK®.

In some embodiments, computing devices may be configured to request user assistance with hash selection, for example by displaying one or more User Interfaces (UIs) configured to receive user selections of data items which are likely shared with a communication target, or which a user identifies as having a high degree of uniqueness. For example, a UI may be configured to receive user selections of one or more specific data items, or a user selection of a category of data items from among a multiple number of categories of data items. Hashes of user-selected data items, or hashes from a user selected category of data items, may be exchanged with the communication target.

In some embodiments, computing devices may be configured to customize each of a multiple number of data items to generate a multiple number of custom data items. These custom data items may be shared with a multiple number of contacts to establish custom data items in secure memory locations accessible by potential communication target devices associated with the contacts. For example, a business having computing devices with which customers engage in secure communications may send a "blast" email to its customers, which email may be identical to the human eye but may contain differences in underlying data, e.g., different pixel properties in an image included in the email. The email may comprise a shared data item for later use as a unique shared secret involved in secure communications between business computing devices and customer computing devices.

In some embodiments, exchanging an identified hash may comprise sending/receiving a group of hashes, and computing devices may be configured to determine the identified hash from among the hashes in the group. For example, a computing device may send one or more "fake" hashes, the fake hashes not corresponding to any shared data items, along with the identified hash. A communication target may then determine the identified hash from among the hashes in the group by checking whether hashes in the group correspond to hashes of data items in the communication target's secure memory. An eavesdropper may observe the hash exchange, but will have difficulty in determining which of the hashes in the group corresponds to a shared data item.

In some embodiments, hashes of data items exchanged by computing devices may comprise hashes of one or more portions of data items, the one or more portions of each data item comprising less than all of each data item. Computing devices may be configured to encrypt and/or decrypt subsequent communications using one or more portions of a data item corresponding to the identified hash as the shared secret, wherein the one or more portions of the data item include portions other than those corresponding to the hashes exchanged by the computing devices. For example, data items may correspond to multiple hashes, with each hash corresponding to a different page or storage block of a multi-page or multi-storage block data item. Computing devices may be configured to exchange hashes of some pages of data items, e.g., pages one and three of data items, and may identify a shared data item using exchanged hashes. Computing devices may be configured to use pages other than those corresponding to exchanged hashes, e.g., pages two and four of a shared data item, as shared secrets for encryption and/or decryption of subsequent communications. An eavesdropper who may theoretically have large amounts of processing power to generate libraries of possible data items from particular observed hashes will not be able to do the same for unexchanged hashes.

Some example solutions according to this disclosure may be configured to make shared secret identification fast, secure, and automatic without revealing shared secrets, even when the communication medium is insecure. Eavesdroppers to devices utilizing solutions according to this disclosure may see an exchange of meaningless non-invertible hashes followed by a sudden secure connection.

In some embodiments, communicating devices may be configured to send batches of hashes at a time. A computing device that identifies a matching hash may be configured to send a coded communication using a data item corresponding to the matching hash as a shared secret encryption key. The sender of the last hash batch may be configured to try each of the potential shared secrets in the most recently sent batch of hashes as a shared secret encryption key. While an eavesdropper may attempt to reverse-engineer the hashes to discover the shared secret, the secure communicating computing devices may optionally be configured to achieve further security by exchanging a supplemental shared secret over a temporarily secure channel.

In some embodiments, computing devices may be configured to exchange hashes entirely within a cloud or between clouds to which communicating parties have access. In some embodiments, computing devices may be configured to exchange hashes in the cloud at high speed and provide the shared secret to each communicating party's communication application through its secure cloud connection. For example, computing devices may authorize a cloud-based exchange of hashes, rather than exchanging hashes directly, and cloud services associated with each computing device may undertake any of the shared secret identification various methods described herein.

In some embodiments, computing devices may employ solutions described herein to guard against classic "man in the middle" scenarios. In an example "man in the middle" scenario, computing device users Alice and Bob may use encryption keys which are intercepted or otherwise available to an eavesdropper X. X may pretend to be Bob's computing device to Alice and Alice's computing device to Bob. However, solutions disclosed herein may be configured to guarantee that X may not have access to shared secrets used by either Alice or Bob. For example, the use of a data item shared only between Alice and Bob as a shared secret may guarantee that X, as a third party, will not have the shared secret. The use of data items shared more broadly may provide less than a complete guarantee that third parties will not have the shared secret; however such data items may be selected to effectively reduce the risk of eavesdropping to near zero.

FIG. 1 is a block diagram illustrating example computing devices engaging in shared secret identification for secure communication, arranged in accordance with at least some embodiments of the present disclosure. FIG. 1 includes a computing device 101 and a computing device 102. Computing device 101 comprises a shared secret identification system 110, a secure communication system 120, a storage subsystem 130, and a secure memory 140. Computing device 102 comprises a shared secret identification system 150, a secure communication system 160, a storage subsystem 170, and a secure memory 180.

Shared secret identification system 110 comprises a hash selector 111 and a hash comparator 112. Secure communication system 120 comprises an encryption / decryption module 121. Secure memory 140 comprises data item hashes 141, user profile data items 142, and system data items 147. User profile data items 142 and/or system data items 147 may include various categories of data items, for example, a category A 143, a category B 144, and a category C 145. Three categories are illustrated in FIG. 1 for simplicity of explanation, however it will be appreciated that more or fewer categories may be present in some embodiments. Like elements in computing device 102, namely shared secret identification system 150, secure communication system 160, storage subsystem 170, and secure memory 180 may be configured similarly to like elements in computing device 101.

In FIG. 1, computing devices 101 and 102 may communicate via any wired or wireless connection. For example, computing devices 101 and 102 may communicate via one or more of a Wi-Fi network, a cellular communication network, and/or a wired communication network such as an Ethernet connection. Computing devices 101 and 102 may both be connected to a network or collection of networks such as the Internet, and may communicate via the network(s).

Either of computing devices 101 or 102 may be referred to herein as a "communication target"—that is, computing device 101 is a communication target of computing device 102, and vice-versa, because a user and/or process on computing device 101 may attempt to enter a secure communication session with computing device 102, and vice-versa. In general, operations of computing device 101 are described herein with reference to computing device 102 as the communication target.

In general, in FIG. 1, hash selector 111 may select hashes 152 to be sent to the communication target. Meanwhile, hash comparator 112 may compare hashes received from the communication target against data item hashes 141. When a matching hash is found, either by computing device 101 or computing device 102, the matching hash may be delivered to the other device as an identified hash 153. Secure communication systems 120 and 160 may use an identical data item in secure memories 140 and 180 corresponding to identified hash 153 as a shared secret for secure communication 154 between computing device 101 and computing device 102.

Computing devices 101 and 102 may be configured to perform an initial handshake 151 to confirm whether both computing devices 101 and 102 are equipped with shared secret identification systems, and optionally to exchange handshake data for use in hash selection. Example handshake data may include a shared secret identification system confirmation, and optionally user identification data and/or device identification data. User identification data may comprise, e.g., names or other identifiers associated with users logged onto computing devices 101 and 102. Device identification data may comprise, e.g., an identifier such as a Global Unique Identifier (GUID) identifying each of computing devices 101 and 102. Shared secret identification system 110 may be configured to initialize hash selector 111 upon confirmation that the communication target is each equipped with a shared secret identification system.

Hash selector 111 may be configured to select which of data item hashes 141 to send to the communication target, e.g., as hashes 152 sent to computing device 102. Hash selector 111 may be configured according to any of a variety of hash selection approaches. In some embodiments, hashes 152 selected by hash selector 111 and sent by computing device 101 to the communication target may comprise hashes of user profile data items 142. User profile data items 142 may for example be selected from among category A 143, category B 144, and/or category C 145. User profile data items 142 may comprise, for example, any data items associated with a user profile established within computing device 101. Such data items may typically comprise user-authored and/or user-downloaded documents, images, video files, emails, text files, and/or portions thereof In some embodiments, hashes 152 selected by hash selector 111 and sent by computing device 101 to the communication target may comprise hashes of data items with sharing histories. For example, hash selector 111 may be configured to search for data items in secure memory 140 that have or are associated with properties corresponding to sharing history, such as data items with metadata indicating multiple authors. An author is typically a human user of a computing device who creates a file, first stores a file on a computing device, and/or otherwise contributes content to a file, for example by writing a paragraph of a document originated by a previous author, or by editing an image originally stored on the computing device by a previous author. Files may include metadata that identifies authors thereof, or in some cases, file content or file system metadata may identify authors of files. Properties corresponding to sharing history may comprise metadata and/or other file properties indicating author(s) different than a user logged on to the computing device 101, properties indicating review and comment by multiple authors/participants, properties indicating storage in multiple locations, and/or properties indicating a history of having been emailed as an attachment and/or saved or uploaded to a network storage location.

In some embodiments, hash selector 111 may be configured to employ a social networking application or social networking API to identify data items with sharing histories. Any or all data items shared via a social network application may be considered to have sharing histories, and may be selected for hash exchange. Hash selector 111 may also be configured with further refinements in hash selection processes, e.g., to identify data items shared with specific users associated with communication targets. Furthermore, in some embodiments, hash selector 111 may be configured to employ a social network application to conduct user identification of target device 102. For example, hash selector 111 may be configured to request, from a social network application, identities of friends nearby who may be users of target device 102. Hash selector 111 may be configured to select hashes of data items having sharing histories for use as hashes 152.

In some embodiments, hash selector 111 may be configured to use handshake data, such as user and/or device identifier data, e.g., a username and GUID, associated with the communication target, to select hashes from among data item hashes 141. For example, hash selector 111 may be configured to identify a user associated with the communication target from handshake data exchanged pursuant to handshake 151, as described herein, and hash selector 111 may be configured to search secure memory 140 to identify data items with sharing histories involving the user associated with the communication target. Hash selector 111 may be configured to select hashes of data items having sharing histories involving the user associated with the communication target for use as hashes 152.

In some embodiments, hashes 152 selected by hash selector 111 and sent by computing device 101 to the communication target may comprise hashes of system data items 147, the system data items 147 comprising one or more of operating system files, application files, or portions thereof. In some embodiments, hashes of system data items 147 as well as hashes of user profile data items 142 may be stored in data item hashes 141, e.g., as deduplication hashes maintained by storage subsystem 130, or as hashes calculated and stored by shared secret identification system 110. In some embodiments, hashes of system data items 147 as well as hashes of user profile data items 142 may be calculated by shared secret identification system 110 at communication time, e.g., in response to handshake 151. Hash selector 111 may be configured to calculate or select hashes of system data items 147 and/or hashes of user profile data items 142 from among data item hashes 141 for exchange with the communication target. System data items 147 may also comprise multiple different categories, similar to categories in user profile data items 142, and hash selector 111 may be configured to select hashes from any system data item category.

In some embodiments, hash selector 111 may be configured to enable user selection of data items in secure memory 140, and to select hashes from among data item hashes 141 according to user data item selections. Similarly, in some embodiments hash selector 111 may be configured to enable user selection of data item types and/or categories, and to select hashes from among data item hashes 141 according to user type/category selections. For example, hash selector 111 may be configured to display a UI configured to receive a user selection of a category of data items from among categories of data items such as category A 143, category B 144, and/or category C 145. Categories may include, for example e-mails, pictures, social data, documents, files from a particular folder, files with certain specified properties, etc. Hash selector 111 may be configured to receive the user selection of a category of data items from among the categories of data items, and computing device 101 may be configured to send hashes 152 comprising hashes of data items in the user-selected categories of data items.

In some embodiments, hash selector 111 may be configured to detect attributes of data items within secure memory 140 that correspond to a security level, and to select hashes from among data item hashes 141 according to security level of corresponding data items. For example, hash selector 111 may be configured to search within secure memory 140 for data items having attributes that correspond to uniqueness/rarity—that is, data items that are not shared, or not likely to be shared, by many users/computing devices beyond computing device 101 and the circle of friends, associates, colleagues and contacts with whom a user of computing device 101 is likely to attempt to communicate with. For example, in general, custom data items such as a user's pictures and documents among user profile data items 142 may be rarer than data items among system data items 147. Other attributes of data items that may correspond to security level may comprise, e.g., password protection of data items, presence of data items in a password protected folder or storage location, or otherwise presence of data items in a memory location within secure memory 140 that may be considered more secure than certain other locations within secure memory 140. In some embodiments, hash selector 111 may be configured to select hashes of more secure data items to be sent as hashes 152 first, followed hashes of less secure data items.

In some embodiments, hash selector 111 may be configured to select hashes corresponding to one or more portions of data items for exchange as hashes 152, the one or more portions of each data item comprising less than all of each data item. For example, data items in secure memory 140 may each comprise multiple portions or segments, such as portions that are stored in several different storage blocks within secure memory 140, or portions corresponding to a set of one or more pages of a multi-page file. Hash selector 111 may be configured to select, for example, hashes of first portions of data items for use as hashes 152, while second and subsequent portions may not be exchanged as hashes 152. Alternatively, hash selector 111 may be configured to select hashes of any other portions comprising less than all of each data item. This approach allows subsequent secure communication 154 to optionally use a shared secret comprising portions of a data item other than those corresponding to hashes 152 exchanged by computing devices 101 and 102. For example, shared secret identification systems 110 and 150 may be configured to exchange hashes of first portions of data items, while secure communication systems 120 and 160 may be configured to use a second portion of a data items as a shared secret for secure communication.

In some embodiments, hash selector 111 may be configured to use any of range of other techniques for hash selection, e.g., hash selector 111 may be configured to select hashes based on data item location within secure memory 140, data item date, data item author, and/or any data item property. In some embodiments, hash selector 111 may be configured to randomly select hashes from among data item hashes 141.

In some embodiments, hash selector 111 may be configured to acquire selected hashes from storage subsystem 130. For example, hash selector 111 may be configured to send a hash request 131 to storage subsystem 130. Hash request 131 may identify hashes from data item hashes 141 and/or data items in secure memory 140. Storage subsystem may return hashes 133 in response to hash request 131. Hash selector 111 may be configured to cause computing device 101 to send one or more hashes from hashes 133 to the communication target, e.g., as hashes 152.

In some embodiments, hash selector 111 may be configured to calculate selected hashes. For example, hash selector 111 may be configured to send a data item request to storage subsystem 130, and hash selector 111 may receive the requested data item(s) in response. Hash selector 111 may be configured to calculate hash(es) of the requested data item(s) using any hashing technique.

Selected hashes may be sent as hashes 152 to the communication target. In some embodiments, hashes 152 may be sent in batches separated by predetermined time intervals. A batch of hashes comprises a group of two or more hashes that are sent together to a communication target. Sending hashes 152 in batches may allow for comparison processing at the communication target and return of identified hash 153, if available, prior to sending a next batch. In some embodiments, each computing device 101 and 102 may be configured to send a batch of hashes 152 to the other, each computing device 101 and 102 may be configured to perform comparison processing, and each computing device 101 and 102 may be configured to repeat sending and comparing of hashes until one of the computing devices 101 or 102 sends a hash flagged as identified hash 153 to the other.

Hash comparator 112 may be configured to perform comparisons of hashes received from the communication target to hashes of data items accessible by computing device 101, such as data item hashes 141 in secure memory 140. In some embodiments, hash comparator 112 may be configured to perform one or more hash comparison 134 interactions with storage subsystem 130, and storage system 130 may be configured to make one or more memory access 135 interactions with secure memory 140 to carry out desired hash comparisons. For example, hash comparator 112 may be configured to request, from storage subsystem 130 via hash comparison 134, whether any of hashes 152 received from computing device 102 are available in data item hashes 141. Storage subsystem 130 may be configured to check via memory access 135 whether hashes specified in hash comparison 134 are available in data item hashes 141. If not, storage subsystem 130 may be configured to return a negative indication to hash comparator 112. If any of hashes specified in hash comparison 134 are available in data item hashes 141, then storage subsystem 130 may be configured to return any matching hashes via another hash comparison 134 interaction with hash comparator 112.

Secure memory 140 may comprise any memory location that is accessible by computing device 101 and/or a user thereof, while being inaccessible by one or more other computing devices or users. For example, a local memory such as a local hard drive or flash memory within a same housing as computing device 101 may comprise secure memory 140 in some embodiments. Other memory locations may also serve as secure memory 140, such as a cloud-based storage location to which computing device 101 has a secure connection, a secure thumb drive, or other memory.

In some embodiments, data item hashes 141 may comprise storage system deduplication hashes of data items stored in secure memory 140. Otherwise, data item hashes 141 may comprise any hashes calculated according to any hashing technique. In some embodiments, shared secret identification system 110 may be configured to calculate data item hashes 141 for use in shared secret identification. Shared secret identification system 110 may for example calculate data item hashes 141 and store data item hashes 141 in a table, list, or other data structure for its use in shared secret identification. In some embodiments, shared secret identification system 110 may be configured to calculate data item hashes at connect time, e.g., in response to handshake 151.

When a matching hash is found by hash comparator 112, shared secret identification system 110 may be configured to send the matching hash to the communication target, e.g., as identified hash 153 to computing device 102. In some embodiments, shared secret identification system 110 may be configured to employ one or more security precautions when sending identified hash 153. For example, shared secret identification system 110 may be configured to send identified hash 153 among a group of hashes including identified hash 153, to make the task of detecting which hash corresponds to a shared data item more difficult for any attempted eavesdropper. One of the hashes in the group may correspond to a hash received from the communication target, while other hashes in the group may not. Shared secret identification system 110 at the communication target, e.g., at computing device 102 (or in the event that computing device 102 sends a group of hashes comprising identified hash 153 to computing device 101, shared secret identification system 110 at computing device 101) may be configured to compare the group of hashes comprising identified hash 153 to hashes 152 which were previously exchanged to determine identified hash 153 from among the group of hashes comprising identified hash 153. Numerous modifications to such a security precaution and/or other security precautions may be applicable in some embodiments and may be developed by those of skill in the art with the benefit of this disclosure.

In response to sending identified hash 153 to the communication target and/or receiving identified hash 153 from the communication target, shared secret identification system 110 may be configured to provide identified hash 153 or data related to it to secure communication system 120. Secure communication system 120 may be configured to retrieve a data item corresponding to identified hash 153, and to encrypt and/or decrypt subsequent communications with the communication target using the data item corresponding to identified hash 153 as a shared secret.

For example, secure communication system 120 may be configured to perform a data item request 136 to storage subsystem 130, for a data item corresponding to identified hash 153. Storage subsystem 130 may be configured to perform memory access 137 to retrieve the requested data item, and storage subsystem 130 may be configured to return the requested data item to secure communication system 120 as data item 138. Secure communication system 120 may be configured to supply data item 138 to encryption/decryption module 121, for use in encrypting and decrypting secure communication 154 with the communication target in one or more secure communication sessions with the communication target.

In embodiments in which hashes 152 of data items sent by computing device 101 comprise hashes of one or more portions of each data item, the one or more portions of each data item comprising less than all of each data item, secure communication system 120 may be configured to encrypt and/or decrypt secure communication 154 using one or more portions of data item 138 corresponding to identified hash 153 as a shared secret, wherein the one or more portions of data 138 item include portions other than those corresponding to hashes 152 sent by computing device 101.

It will be appreciated that in some embodiments, shared secret identification system 110 may be configured to make data item request 136 and receive data item 138, and to then supply data item 138 to secure communication system 120, as an alternative to supplying identified hash 153 to secure communication system 120 and allowing secure communication system 120 to retrieve data item 138 from secure memory 140 as described above. Furthermore, it will be appreciated that while in some embodiments an unmodified data item or portion(s) thereof may be used as a shared secret, in other embodiments shared secret identification systems 110 and 150, and/or secure communication systems 120 and 160 may be configured to modify data items prior to using them as shared secrets. For example, some modification approaches may comprise hashing a data item using a second hash method, either all at once or in chunks, and using the hashed data item or portion(s) thereof as a shared secret.

Figure 2:
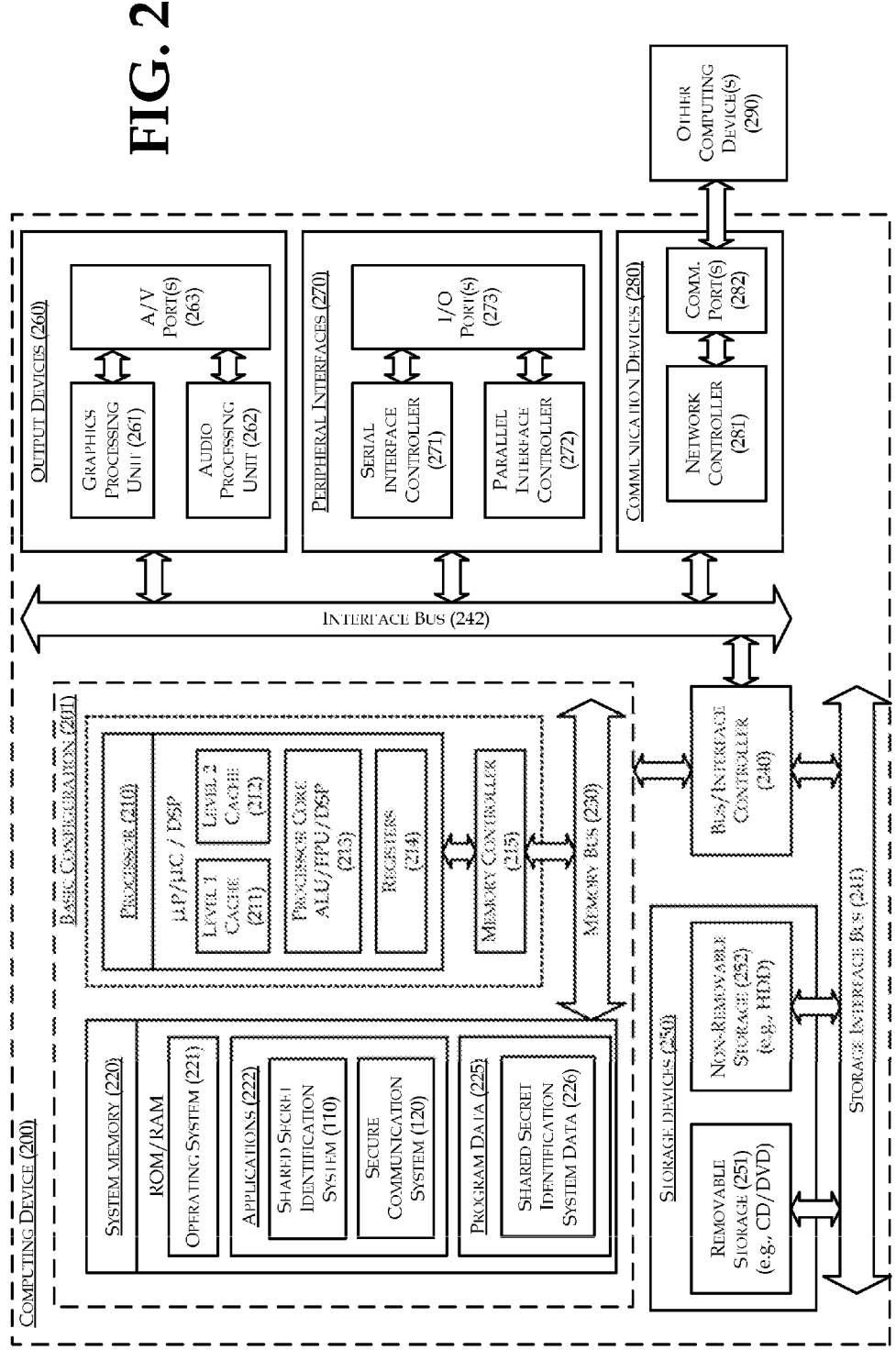
FIG. 2 is a block diagram illustrating an example computing device as one example of a computing device configured to perform shared secret identification for secure communication.

FIG. 2 is a block diagram of a computing device 200 as one example of a computing device configured to perform shared secret identification for secure communication, arranged in accordance with at least some embodiments of the present disclosure. Either of computing devices 101 or 102 may be configured similar to computing device 200 in some embodiments. In a very basic configuration 201, computing device 200 may include one or more processors 210 and system memory 220. A memory bus 230 may be used for communicating between the processor 210 and the system memory 220.

Depending on the desired configuration, processor 210 may be of any type including but not limited to a microprocessor (μP), a microcontroller (μC), a digital signal processor (DSP), or any combination thereof Processor 210 may include one or more levels of caching, such as a level one cache 211 and a level two cache 212, a processor core 213, and registers 214. The processor core 213 may include an arithmetic logic unit (ALU), a floating point unit (FPU), a digital signal processing core (DSP Core), or any combination thereof A memory controller 215 may also be used with the processor 210, or in some implementations the memory controller 215 may be an internal part of the processor 210.

Depending on the desired configuration, the system memory 220 may be of any type including but not limited to volatile memory (such as RAM), non-volatile memory (such as ROM, flash memory, etc.), or any combination thereof System memory 220 typically includes an operating system 221, one or more applications 222, and program data 225. In some embodiments, operating system 221 may comprise a virtual machine that is managed by a Virtual Machine Manager (VMM). In some embodiments, operating system 221 may comprise storage subsystem 130, illustrated in FIG. 1. Operating system 221 may also comprise shared secret identification system 110 and secure communication system 120 in some embodiments. Alternatively, applications 222 may include shared secret identification system 110 and secure communication system 120, as illustrated in FIG. 2. Program data 225 may include shared secret identification system data 226 for use by shared secret identification system 110 and/or secure communication system 120.

Computing device 200 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. Any of data storage devices 250 may comprise secure memory such as secure memory 140 illustrated in FIG. 1. The data storage devices 250 may be removable storage devices 251, non-removable storage devices 252, or a combination thereof Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

In some embodiments, secure memory 140, as illustrated in FIG. 1, may include any storage devices accessible by computing device 200, such as system memory 220, storage devices 250, communication devices 280, and/or other computing devices 290. Secure memory may include any of a variety of memory locations subject to any of a variety of security measures. Secure memory may comprise local hard drives, which are typically secure at least to some degree by virtue of being inaccessible to users not having physical possession of a device, and may be further secured by password protection and/or encryption technologies. Networked drives may be secure by requiring authentication or other security precautions.

Level 1 cache 211, level 2 cache 212, system memory 220, removable storage 251, and non-removable storage devices 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 200. Any such computer storage media may be part of device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more AN ports 263. Example peripheral interfaces 270 may include a serial interface controller 271 or a parallel interface controller 272, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 273. Other conventional I/O devices may be connected as well such as a mouse, keyboard, and so forth. An example communications device 280 includes a network controller 281, which may be arranged to facilitate communications with one or more other computing devices 290 over a network communication via one or more communication ports 282. In some embodiments, communications device 280 may comprise secure communication system 120 illustrated in FIG. 1.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 200 may be implemented as a mobile device, such as a smart phone or tablet, and/or as a personal or business use computer including both laptop computer and non-laptop computer configurations. Computing device 200 may also be implemented as any of a wide range of electronic devices as will be appreciated.

Figure 3:
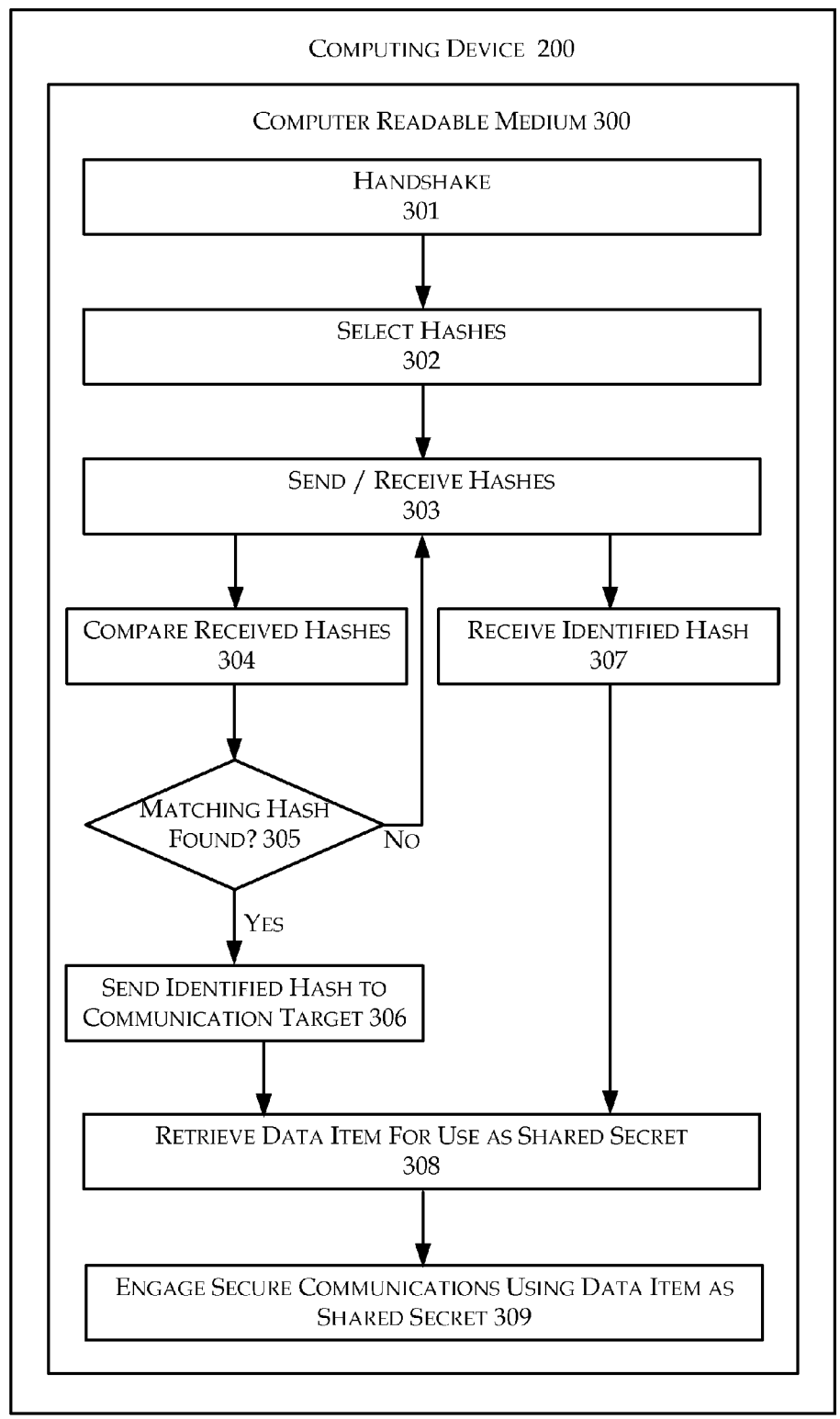
FIG. 3 is a flow diagram illustrating an example method for identifying shared secrets for secure communication.

FIG. 3 is a flow diagram illustrating an example method for identifying shared secrets for secure communication, arranged in accordance with at least some embodiments of the present disclosure. The example flow diagram may include one or more operations/modules as illustrated by blocks 301-309, which represent operations as may be performed in a method, functional modules in computing device 200, and/or instructions as may be recorded on a computer readable medium 300.

In FIG. 3, blocks 301-309 are illustrated as including blocks being performed sequentially, e.g., with block 301 first and block 309 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 3 illustrates an example method by which computing device 200 may identify a shared secret for secure communication and engage a secure communication session using the shared secret. In general, computing device 200 may exchange hashes with a communication target to identify a data item shared between computing device 200 and the communication target for use as the shared secret.

At a "Handshake" block 301, computing device 200 may employ any handshake protocol with a communication target. In some embodiments, a Transport Layer Security (TLS) and/or Secure Sockets Layer (SSL) type handshake may be employed. In some embodiments, Transmission Control Protocol (TCP) handshake may be employed. A variety of handshake protocols are available or may be developed for different communications technologies and any handshake protocol may be employed in connection with embodiments of this disclosure. In some embodiments, computing device 200 may perform an augmented handshake to gather data for use in hash selection, in addition to handshake data that may be typically exchanged pursuant to a given handshake protocol. For example, computing device 200 may gather user identifier and/or device identifier information from the communication target. Block 301 may be followed by block 302.

At a "Select Hashes" block 302, computing device 200 may select hashes to send to the communication target, as described in connection with hash selector 111 in FIG. 1. In some embodiments, selected hashes may comprise storage system deduplication hashes of data items stored in a local memory of computing device 200. In some embodiments, selected hashes may comprise hashes of user profile data items, the user profile data items comprising one or more of emails, text files, image files, or portions thereof In some embodiments, selected hashes may comprise hashes of system data items, the system data items comprising one or more of operating system files, application files, or portions thereof In some embodiments, selected hashes may comprise hashes of data items with sharing histories. In some embodiments, selected hashes may comprise hashes of one or more portions of each data item, the one or more portions of each data item comprising less than all of each data item, so that subsequent encrypting or decrypting of secure communications can use portions other than those corresponding to the hashes sent by the computing device.

In some embodiments, block 302 may comprise identifying, by computing device 200, a user associated with the communication target and data items with sharing histories involving the user associated with the communication target. For example, when user identifier information is exchanged in block 301, the user identifier information may be used to identify the user associated with the communication target. Alternatively, a UI may request user entry of a user identifier associated with the communication target. Computing device 200 may then identify data items with sharing histories involving the user of the communication target, and computing device 200 may include hashes of such data items among hashes of data items sent by computing device 200 in block 303. In some embodiments, a shared secret identification system may be configured to cooperate with one or more other applications to identify a user associated with the communication target and/or data items with sharing histories involving the user associated with the communication target. For example, a social networking application may have access to user identifiers as well as data items that have been shared among various users.

In some embodiments, block 302 may comprise user-directed hash selection, for example by displaying, by computing device 200, a UI configured to receive a user selection of a category of data items from among a multiple number of categories of data items, and receiving, by computing device 200, the user selection of a category of data items from among the multiple number of categories of data items. Categories of data items may include, for example, file type categories such as emails, pictures, documents, and/or other file types; storage location categories such as folders, drives, and/or other storage locations; file property categories such as files matching particular search criteria, files having certain file names and/or creations dates; and/or any other categories as may be useful for particular embodiments. Computing device 200 may include hashes of data items in the user-selected category of data items among hashes of data items sent by computing device 200 in block 303. Block 302 may be followed by block 303.

At a "Send/Receive Hashes" block 303, computing device 200 may send, to the communication target, hashes of data items stored in a secure memory location accessible by computing device 200. Hashes sent by computing device 200 may comprise hashes selected in block 302. Alternatively or in combination with sending hashes, computing device 200 may receive hashes of data items stored in a secure memory location accessible by the communication target. Two-way hash exchange, comprising both sending and receiving hashes, is not required for all embodiments. In some embodiments, computing device 200 may send hashes without receiving hashes in block 303, and in such embodiments computing device 200 need not perform blocks 304-306. Instead, computing device 200 may wait to receive an identified hash in block 307, and may proceed to block 308. In some embodiments, computing device 200 may receive hashes without sending hashes in block 303, and in such embodiments computing device 200 need not perform block 307. Instead, computing device 200 may perform blocks 303-306 until an identified hash is found and sent to the communication target in block 306.

In some embodiments, computing device 200 may send successive batches of hashes in block 303 until a matching hash is identified. For example, in block 303, a batch of hashes may be sent to the communication target, and a different batch of hashes may be received from the communication target. The received batch of hashes may be compared to determine if a matching hash is found in blocks 304-305. If no matching hash is found, computing device 200 may return to block 303 to exchange additional batches of hashes with the communication target. If a matching hash is found in blocks 304-305, or received in block 307, computing device 200 may proceed to block 308. Block 303 may be followed by block 304 or block 307.

At a "Compare Received Hashes" block 304, computing device 200 may compare hashes received from the communication target in block 303 to hashes of data items stored in the secure memory location accessible by computing device 200. Computing device 200 may compare hashes in block 304 identify a matching hash. The identified hash may indicate that computing device 200 has access to a data item corresponding to the identified hash in the secure memory location accessible by computing device 200. In some embodiments, comparing received hashes may comprise providing received hashes to a storage subsystem so that the storage subsystem can check for the received hashes in the secure memory accessible by computing device 200, and receiving an indication of any matching hashes from the storage subsystem. In some embodiments, comparing received hashes may comprise looking up received hashes in a hash table or other data structure accessible by computing device 200. Block 304 may be followed by decision block 305.

At a "Matching Hash Found?" decision block 305, computing device 200 may return to block 303 when no matching hash is found in block 304, or proceed to block 306 when one or more matching hashes are found in block 304. Decision block 305 may therefore be followed by block 306 when a matching hash is found, or decision block 305 may be followed by block 303 when no matching hash is found.

At a "Send Identified Hash to Communication Target" block 306, computing device 200 may send a hash identified as a matching hash in block 304 to the communication target. In some embodiments, security precautions may be taken when sending the identified hash, e.g., by sending a group of hashes including the identified hash, as described in connection with FIG. 1. Also, in some embodiments, the identified hash may be identified by information other than the identified hash itself. For example, computing device 200 may send hash identification information indicating, for example, that the $3^{rd}$ hash from within batch #2 received from the communication target matches a hash within the secure memory accessible by computing device 200. Block 306 may be followed by block 308.

At a "Receive Identified Hash" block 307, computing device 200 may receive, from the communication target, an identified hash from among the hashes sent by computing device in block 303. The identified hash may indicate that the communication target has access to a data item corresponding to the identified hash in a secure memory location accessible by the communication target. In some embodiments, the identified hash received in block 307 may comprise a hash along with information to indicate that the hash is a match and/or that the communication target will proceed to initiate a secure connection using a corresponding data item as a shared secret. In some embodiments, the identified hash received in block 307 may comprise a group of hashes, and computing device 200 may determine the identified hash from among the hashes in the group, e.g., as discussed herein. In response to receiving the identified hash, computing device 200 may terminate operation of blocks 303-306. Block 307 may be followed by block 308.

At a "Retrieve Data Item for Use as Shared Secret" block 308, computing device 200 may locate, in the secure memory accessible by computing device 200, a data item corresponding to the identified hash that was either sent to the communication target in block 306, or received from the communication target in block 307. In some embodiments, computing device 200 may load the data item into a secure communication system for use as a shared secret. In some embodiments, computing device 200 may identify portions of the data item other than, or in addition to, those portions corresponding to the identified hash, for use as a shared secret. Block 308 may be followed by block 309.

At an "Engage Secure Communications Using Data Item as Shared Secret" block 309, computing device 200 may encrypt and/or decrypt communications with the communication target using the data item corresponding to the identified hash as a shared secret. The encrypted/decrypted communications with the communication target may be referred to herein as "subsequent" communications, because they are subsequent to shared secret identification. Computing device 200 may use any permutations of the data item retrieved in block 308 to encrypt and/or decrypt secure communications. In some embodiments, encryption/decryption of subsequent communications may use a shared secret comprising portions of a data item other than those portions corresponding to hashes exchanged by computing device 200 and the communication target.

In some embodiments, in addition to the blocks illustrated in FIG. 3, computing device 200 may store a data item and/or a data item identifier for use in any subsequent secure communications with a particular communication target. For example, computing device 200 may keep a table comprising communication target device identifiers and shared secret identifiers, for use in looking up shared secrets for communication with communication targets. Determining whether a shared secret has previously been identified for secure communications with a particular communication target may be conducted after block 301 and before block 302. Computing device 200 may omit blocks 303-307 when a shared secret has been previously identified for secure communication, and computing device 200 may instead proceed directly to block 308. In other words, when a shared secret has previously been identified, computing device 200 may attempt to re-use the previously identified shared secret. If the previously identified shared secret is inoperable in block 309, computing device may return to block 303 and re-engage in shared secret identification as described herein.

Figure 4:
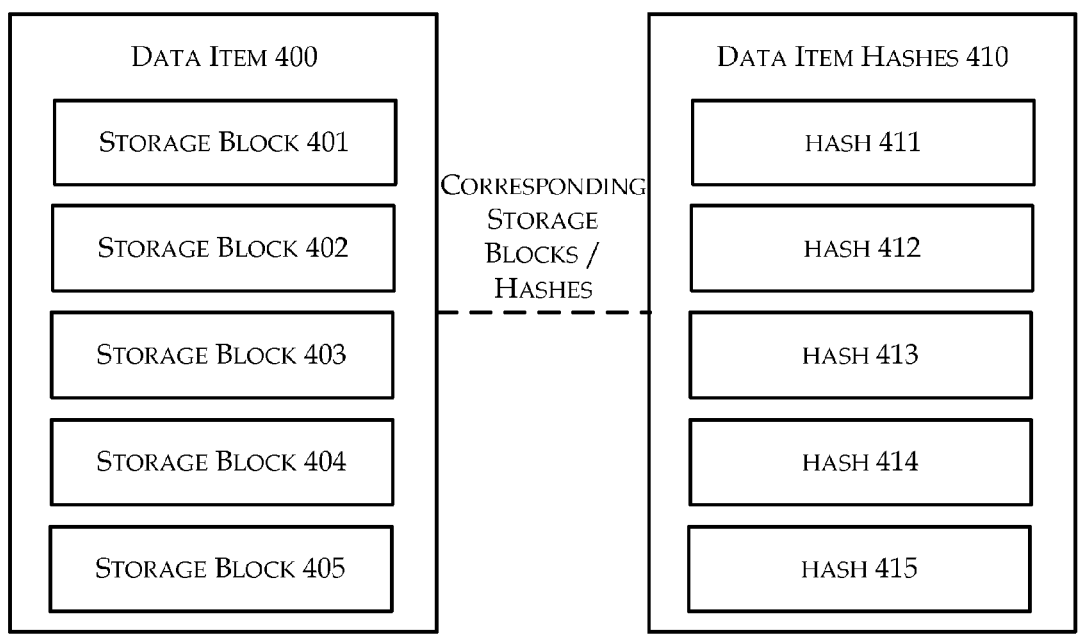
FIG. 4 is a block diagram illustrating an example data item and corresponding hashes.

FIG. 4 is a block diagram illustrating an example data item and corresponding hashes, arranged in accordance with at least some embodiments of the present disclosure. FIG. 4 includes a data item 400 and data item hashes 410. Data item 400 includes storage blocks 401-405. Data item hashes 410 include hashes 411-415. Five storage blocks and five hashes are illustrated in FIG. 4 as an example of multiple storage blocks and multiple corresponding hashes, however it will be appreciated that data items may include more or fewer storage blocks, and data item hashes may include more or fewer hashes.

Data item 400 and the various storage blocks 401-405 may comprise a data item in secure memory 140, e.g., a data item within user profile data items 142 or within system data items 147. Data item 400 includes a first storage block 401, a second storage block 402, a third storage block 403, a fourth storage block 404, and a fifth storage block 405. Storage blocks 401-405 may comprise blocks of data of any given size, or blocks of data that are otherwise separated by some delineator, such as successive emails or other files in an archive, or parts thereof. For example, in some embodiments, first storage block 401 may represent page one of data item 400; second storage block 402 may represent page two of data item 400; third storage block 403 may represent page three of data item 400; fourth storage block 404 may represent page four of data item 400; and fifth storage block 405 may represent page five of data item 400.

Data item hashes 410 may include hashes 411-415 corresponding to data item storage blocks 401-405. For example, hash 411 may correspond to first storage block 401, hash 412 may correspond to second storage block 402, hash 413 may correspond to third storage block 403, hash 414 may correspond to fourth storage block 404, and hash 415 may correspond to fifth storage block 405. In some embodiments, data item hashes 410 may comprise deduplication hashes calculated by storage subsystem 130. In some embodiments, data item hashes 410 may comprise any hash types calculated for example by shared secret identification system 110. Data item hashes 410 may be stored within secure memory 140, as shown in FIG. 1, or data item hashes 410 may be stored in any other memory location accessible by computing device 101.

In some embodiments, computing devices and/or processes for identifying a shared secret may identify one or more of hashes 411-415 as a matching hash, that matches a hash at a communication target. The matching hash may be exchanged as an identified hash as described herein. Computing devices may then use data item 400, or any combination of storage blocks 401-405, as a shared secure for secure communications.

For example, computing device 200 may send hashes 411 and/or 413 to a communication target and the communication target may return hash 411 and/or hash 413 to computing device 200 as identified hashes. In some embodiments, computing device 200 and the communication target may then use storage blocks within data item 400 that correspond to unexchanged hashes, such as storage blocks 402 and/or 404, corresponding to unexchanged hashes 412 and 414, or all of storage blocks 401-405, as the shared secret for a subsequent secure communication session. An intercepting computing device, attempting to eavesdrop on the secure communication session, may theoretically calculate all possible data blocks that may correspond to exchanged hashes 411 and/or 413, even though in practice, such a calculation may prove effectively impossible as it would require more computing time, cost, and expense than may be reasonably available. However, the intercepting computing device would not be able to calculate all possible data blocks for unexchanged hashes 412, 414, and/or 415 and therefore embodiments employing unexchanged hashes as at least a portion of a shared secret may have an additional security advantage. It should be emphasized however, that the use of portions of data items corresponding to unexchanged hashes in a shared secret is not required for all embodiments of this disclosure.

Figure 5:
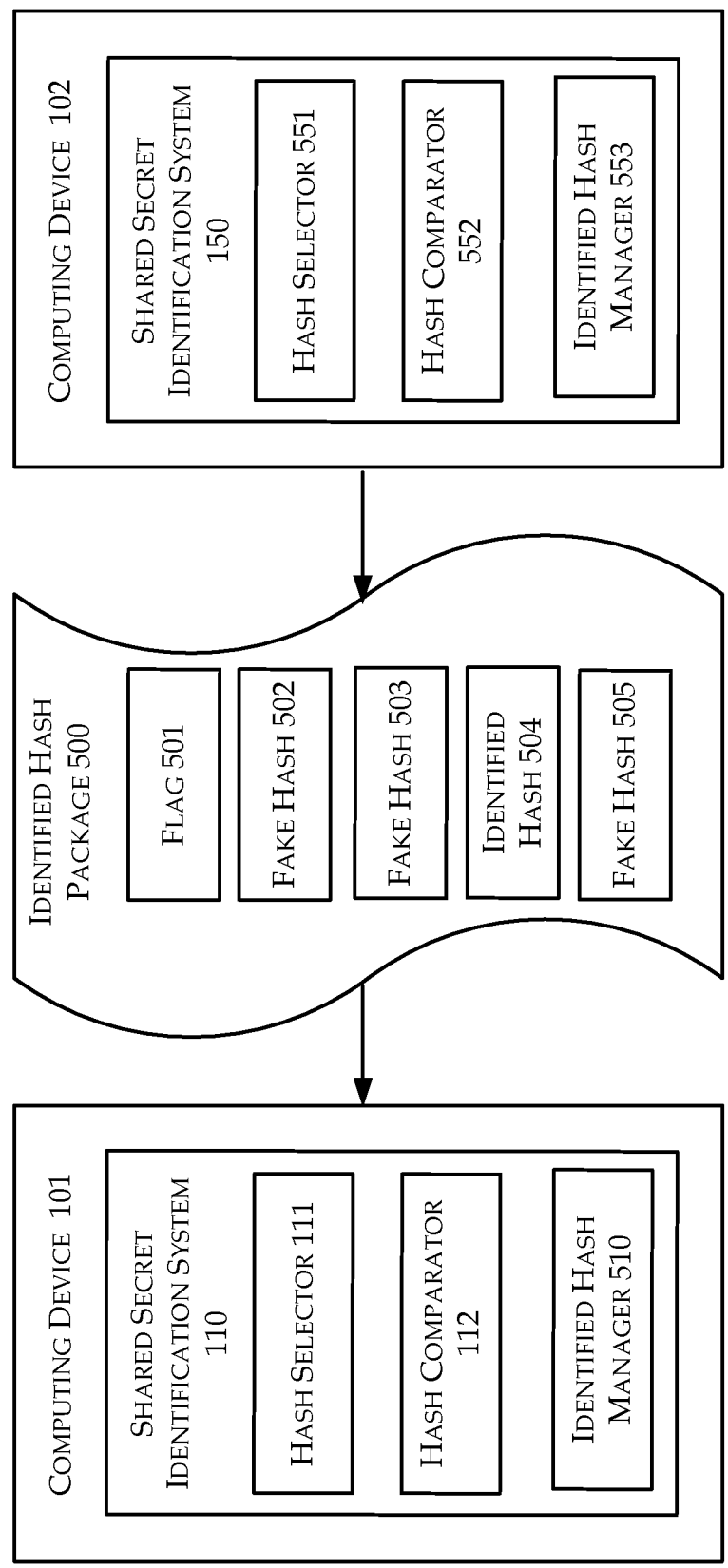
FIG. 5 is a block diagram illustrating example computing devices exchanging an identified hash.

FIG. 5 is a block diagram illustrating example computing devices exchanging an identified hash, arranged in accordance with at least some embodiments of the present disclosure. FIG. 5 includes computing device 101, computing device 102, and an identified hash package 500. Computing device 101 includes shared secret identification system 110, comprising hash selector 111 and hash comparator 112, as illustrated in FIG. 1, as well as identified hash manager 510. Computing device 102 includes shared secret identification system 150, as illustrated in FIG. 1, where shared secret identification system 150 comprises a hash selector 551, a hash comparator 552, and an identified hash manager 553. Identified hash package 500 comprises a flag 501, and a group of hashes comprising a fake hash 502, a fake hash 503, an identified hash 504, and a fake hash 505.

In FIG. 5, shared secret identification systems 110 and 150 may be configured with identified hash managers 510 and 553, to exchange package 500. Identified hash managers 510 and 553 may be configured to generate identified hash package 500 and send identified hash package 500 to a communication target, in response to identification of a matching hash by hash comparator 112 or 552. Identified hash managers 510 and 553 may also be configured to extract identified hash 504 from identified hash package 500 received from a communication target.

For example, in response to identifying a matching hash, identified hash manager 553 may be configured to package the matching hash, as identified hash 504 into identified hash package 500 along with fake hashes 502, 503, and 505, and flag 501. Upon receiving identified hash package 500, identified hash manager 510 may be configured to read flag 501 to determine identified hash package 500 comprises an identified hash, and to compare hashes 502-505 to hashes exchanged by computing devices 101 and 102, such as hashes 152 in FIG. 1, to determine which hash among hashes 502-505 is identified hash 504 corresponding to a data item to be used as a shared secret. Fake hashes 502, 503, and 505 may for example comprise non-matching hashes from among previously exchanged hashes—that is, hashes that do not match corresponding hashes of data items at computing device 102.

Figure 6:
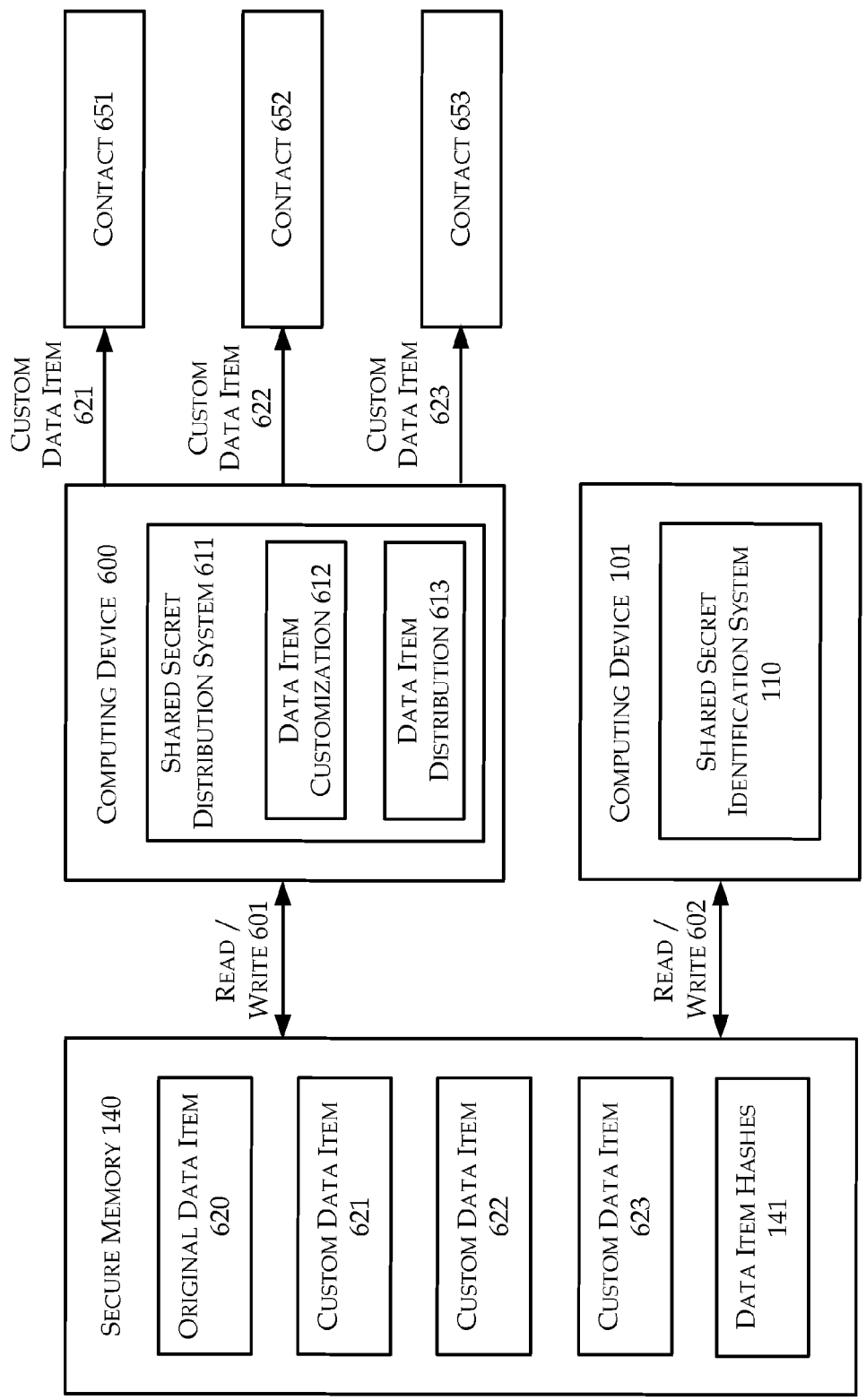
FIG. 6 is a block diagram illustrating an example method for distributing customized data items for use as shared secrets, all arranged in accordance with at least some embodiments of the present disclosure.

FIG. 6 is a block diagram illustrating an example method for distributing customized data items for use as shared secrets, arranged in accordance with at least some embodiments of the present disclosure. FIG. 6 includes a computing device 600, computing device 101, secure memory 140, and contacts 651, 652, and 653. Computing device 600 comprises a shared secret distribution system 611, comprising a data item customization module 612 and a data item distribution module 613. Secure memory 140 comprises an original data item 620, custom data items 621-623 and data item hashes 141. Computing device 101 comprises shared secret identification system 110.

In FIG. 6, computing devices 600 and 101 and secure memory 140, may for example be operated by a first entity, such as a company, while contacts 651-653 may comprise users and/or devices interacting with the first entity, for example, contacts 651-653 may comprise customer email accounts and/or computing devices operated by customers of the company. Computing devices 600 and 101 and secure memory 140 may for example be communicatively coupled via LAN type connections, while computing devices 600 and 101 may for example communicate with contacts 651-653 via WAN connections, e.g., via connections to the internet.

In FIG. 6, shared secret distribution system 611 may be configured to generate custom data items 621-623, and to share custom data items 621-623 with contacts 651-653 to establish custom data items 621-623 in secure memory locations accessible by potential communication target devices associated with the multiple number of contacts 651-653. Meanwhile, computing device 101 may be configured as described in connection with FIG. 1 to use shared secret identification system 110 to identify shared secrets for use in encrypting and decrypting communications with communication targets comprising, inter alia, devices associated with contacts 651-653.

In some embodiments, data item customization 612 may be configured to access original data item 620 via read/write access 601 to secure memory 140. Original data item 620 may comprise, for example, an image to be inserted in an email to contacts 651-653. Data item customization 612 may be configured to automatically customize original data item 620 to create custom data items 621-623, for example by making changes to one or more pixels within the image, and saving various modified versions of original data item 620 in secure memory 140 as custom data items 621-623.

In some embodiments, data item distribution 613 may be configured to cause computing device 600 to send different custom data items to each of contacts 651-653. For example, as shown in FIG. 6, computing device 600 may send custom data item 621 to contact 651, computing device 600 may send custom data item 622 to contact 652, and computing device 600 may send custom data item 623 to contact 653. An effect of sending different custom data items to each of contacts 651-653 is that a unique data item can be established in memories associated with each of contacts 651-653 for later use as a shared secret for communicating with computing device 101. In some embodiments, data item distribution 613 may be configured to label custom data items 621-623 with metadata to indicate which contact 651, 652, or 653 each of custom data items 621-623 is shared with. Computing device 101 may be configured to make read/write access 602 as described in connection with accesses to secure memory 140 in FIG. 1, to identify and use custom data items 621-623 in secure communications with any of contacts 651-653.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof

The invention claimed is:

1. A secure communication method, comprising:
identifying, by a computing device, a shared secret for a secure communication session with a communication target, wherein identifying the shared secret comprises:
sending, by the computing device to the communication target, hashes of data items stored in a secure memory location accessible by the computing device; and
receiving, by the computing device, an identified hash from among the hashes sent by the computing device, wherein the identified hash comprises a matching hash identified by comparison, by the communication target, of the hashes sent by the computing device to hashes of data items stored in a secure memory location accessible by the communication target, wherein the identified hash therefore indicates that the computing device and the communication target each have access to an identical data item corresponding to the identified hash in secure memory locations accessible by the computing device and the communication target, respectively, and wherein the identical data item is identified at the computing device as the shared secret; and
encrypting or decrypting, by the computing device, subsequent communications in the secure communication session with the communication target using the identical data item corresponding to the identified hash as the shared secret.

2. The method of claim 1, wherein the hashes of data items sent by the computing device comprise storage system deduplication hashes of data items stored in a local memory of the computing device.

3. The method of claim 1, wherein the hashes of data items sent by the computing device comprise hashes of user profile data items, the user profile data items comprising one or more of emails, text files, image files, or portions thereof.

4. The method of claim 1, wherein the hashes of data items sent by the computing device comprise hashes of system data items, the system data items comprising one or more of operating system files, application files, or portions thereof.

5. The method of claim 1, wherein the hashes of data items sent by the computing device comprise hashes of data items with sharing histories.

6. The method of claim 1, further comprising:
identifying, by the computing device, a user associated with the communication target; and
identifying, by the computing device, data items with sharing histories involving the user associated with the communication target;
wherein the hashes of data items sent by the computing device comprise hashes of the data items with sharing histories involving the user associated with the communication target.

7. The method of claim 1, further comprising:
displaying, by the computing device, a User Interface (UI) configured to receive a user selection of a category of data items from among a plurality of categories of data items; and
receiving, by the computing device, the user selection of a category of data items from among the plurality of categories of data items;
wherein the hashes of data items sent by the computing device comprise hashes of data items in the user-selected category of data items.

8. The method of claim 1, further comprising:
generating a plurality of custom data items; and
sharing the custom data items with a plurality of contacts to establish the custom data items in secure memory locations accessible by potential communication target devices associated with the plurality of contacts.

9. The method of claim 1, wherein receiving the identified hash comprises receiving a group of hashes, and further comprising determining the identified hash from among the hashes in the group.

10. The method of claim 1, wherein the hashes of data items sent by the computing device comprise hashes of one or more portions of each data item, the one or more portions of each data item comprising less than all of each data item, and wherein encrypting or decrypting the subsequent communication uses one or more portions of the data item corresponding to the identified hash as the shared secret, wherein the one or more portions of the data item include portions other than those corresponding to the hashes sent by the computing device.

11. A non-transitory computer readable storage medium having computer executable instructions executable by a processor at a computing device, the instructions that, when executed by the processor, cause the processor to:
identify a shared secret for a secure communication session between the computing device and a communication target, wherein the instructions that cause the processor to identify the shared secret comprise instructions that cause the processor to:
send, to the communication target, hashes of data items stored in a secure memory location accessible by the computing device; and
receive an identified hash from among the hashes sent by the computing device, wherein the identified hash comprises a matching hash identified by comparison, by the communication target, of the hashes sent by the computing device to hashes of data items stored in a secure memory location accessible by the communication target, wherein the identified hash therefore indicates that the computing device and the communication target each have access to an identical data item corresponding to the identified hash in secure memory locations accessible by the computing device and the communication target, respectively, and wherein the identical data item is identified at the computing device as the shared secret; and
encrypt or decrypt subsequent communications in the secure communication session with the communication target using the identical data item corresponding to the identified hash as the shared secret.

12. A computing device, comprising:
a processor;
a memory; and
a secure communication module stored in the memory and executable by the processor, wherein the secure communication module is configured to:
identify a shared secret for a secure communication session between the computing device and a communication target, wherein identifying the shared secret comprises:
sending, to the communication target, hashes of data items stored in a secure memory location accessible by the computing device; and
receiving an identified hash from among the hashes sent by the computing device, wherein the identified hash comprises a matching hash identified by comparison, by the communication target, of the hashes sent by the computing device to hashes of data items stored in a secure memory location accessible by the communication target, wherein the identified hash therefore indicates that the computing device and the communication target each have access to an identical data item corresponding to the identified hash in secure memory locations accessible by the computing device and the communication target, respectively, and wherein the identical data item is identified at the computing device as the shared secret; and
encrypt or decrypt subsequent communications in the secure communication session with the communication target using the identical data item corresponding to the identified hash as the shared secret.

13. A secure communication method, comprising:
identifying, by a computing device, a shared secret for a secure communication session with a communication target, wherein identifying the shared secret comprises:
receiving, by the computing device, hashes of data items stored in a secure memory location accessible by the communication target;
comparing, by the computing device, the received hashes to hashes of data items stored in a secure memory location accessible by the computing device, to identify a hash among the received hashes that matches a hash among the hashes of data items stored in the secure memory locations accessible by the computing device,
wherein the identified hash indicates that the computing device and the communication target each have access to an identical data item corresponding to the identified hash in secure memory locations accessible by the computing device and the communication target, respectively, and wherein the identical data item is identified at the computing device as the shared secret; and
sending, by the computing device, the identified hash to the communication target; and
encrypting or decrypting, by the computing device, subsequent communications in the secure communication session with the communication target using the identical data item corresponding to the identified hash as the shared secret.

14. The method of claim 13 wherein the hashes of data items that are compared to the received hashes comprise storage system deduplication hashes of data items stored in a local memory of the computing device.

15. The method of claim 13, wherein the hashes of data items that are compared to the received hashes comprise hashes of user profile data items, the user profile data items comprising one or more of emails, text files, image files, or portions thereof 16. The method of claim 13, wherein the hashes of data items that are compared to the received hashes comprise hashes of system data items, the system data items comprising one or more of operating system files, application files, or portions thereof 17. The method of claim 13, wherein the hashes of data items that are compared to the received hashes comprise hashes of data items with sharing histories.

18. The method of claim 13, further comprising:
identifying, by the computing device, a user associated with the communication target; and
identifying, by the computing device, data items with sharing histories involving the user associated with the communication target;
wherein the hashes of data items that are compared to the received hashes comprise hashes of the data items with sharing histories involving the user associated with the communication target.

19. The method of claim 13, further comprising:
displaying, by the computing device, a User Interface (UI) configured to receive a user selection of a category of data items from among a plurality of categories of data items; and
receiving, by the computing device, the user selection of a category of data items from among the plurality of categories of data items;
wherein the hashes of data items that are compared to the received hashes comprise hashes of data items in the user-selected category of data items.

20. The method of claim 13, further comprising:
generating a plurality of custom data items; and
sharing the custom data items with a plurality of contacts to establish the custom data items in secure memory locations accessible by potential communication target devices associated with the plurality of contacts.

21. The method of claim 13, wherein sending the identified hash comprises sending a group of hashes including the identified hash.

22. The method of claim 13, wherein the identified hash corresponds to one or more portions of the data item corresponding to the identified hash, the one or more portions of the data item comprising less than all of the data item, and wherein encrypting or decrypting the subsequent communication uses one or more portions of the data item other than those corresponding to the identified hash as the shared secret.

23. A non-transitory computer readable storage medium having computer executable instructions executable by a processor at a computing device, the instructions that, when executed by the processor cause the processor to:
identify a shared secret for a secure communication session between the computing device and a communication target, wherein the instructions that cause the processor to identify the shared secret comprise instructions that cause the processor to:
receive hashes of data items stored in a secure memory location accessible by the communication target;
compare the received hashes to hashes of data items stored in a secure memory location accessible by the computing device, to identify a hash among the received hashes that matches a hash among the hashes of data items stored in the secure memory location accessible by the computing device, wherein the identified hash indicates that the computing device and the communication target each have access to an identical data item corresponding to the identified hash in secure memory locations accessible by the computing device and the communication target, respectively, and wherein the identical data item is identified at the computing device as the shared secret; and
send the identified hash to the communication target; and
encrypt or decrypt subsequent communications in the secure communication session with the communication target using the identical data item corresponding to the identified hash as the shared secret.

24. A computing device, comprising:
a processor;
a memory; and
a secure communication module stored in the memory and executable by the processor, wherein the secure communication module is configured to:
identify a shared secret for a secure communication session between the computing device and a communication target, wherein identifying the shared secret comprises:
receive receiving hashes of data items stored in a secure memory location accessible by the communication target;
comparing the received hashes to hashes of data items stored in a secure memory location accessible by the computing device, to identify a hash among the received hashes that matches a hash among the hashes of data items stored in the secure memory location accessible by the computing device, wherein the identified hash indicates that the computing device and the communication target each have access to an identical data item corresponding to the identified hash in secure memory locations accessible by the computing device and the communication target, respectively, and wherein the identical data item is identified at the computing device as the shared secret; and
sending the identified hash to the communication target; and
encrypt or decrypt subsequent communications in the secure communication session with the communication target using the identical data item corresponding to the identified hash as the shared secret.

* * * * *

UNITED STATES PATENT AND TRADEMARK OFFICE
CERTIFICATE OF CORRECTION

PATENT NO. : 8,997,179 B2  
APPLICATION NO. : 13/816717  
DATED : March 31, 2015  
INVENTOR(S) : Kruglick Page 1 of 2

It is certified that error appears in the above-identified patent and that said Letters Patent is hereby corrected as shown below:

In the Specification

In Column 1, Line 16, delete "otherw ise" and insert -- otherwise --, therefor.

In Column 1, Line 35, delete "in G" and insert -- in G. --, therefor.

In Column 8, Line 61, delete "thereof" and insert -- thereof. --, therefor.

In Column 13, Line 45, delete "thereof" and insert -- thereof. --, therefor.

In Column 13, Line 51, delete "thereof" and insert -- thereof. --, therefor.

In Column 13, Line 57, delete "thereof" and insert -- thereof. --, therefor.

In Column 14, Line 15, delete "thereof" and insert -- thereof. --, therefor.

In Column 14, Line 58, delete "AN ports 263." and insert -- A/V ports 263. --, therefor.

In Column 16, Line 9, delete "thereof" and insert -- thereof. --, therefor.

In Column 16, Line 12, delete "thereof" and insert -- thereof. --, therefor.

In Column 22, Line 1, delete "thereof" and insert -- thereof. --, therefor.

In Column 24, Line 11, delete "thereof" and insert -- thereof. --, therefor.

In the Claims

In Column 26, Line 41, in Claim 13, delete "locations" and insert -- location --, therefor.

In Column 26, Line 57, in Claim 14, delete "claim 13" and insert -- claim 13, --, therefor.

Signed and Sealed this  
Twenty-eighth Day of July, 2015

Michelle K. Lee  
*Director of the United States Patent and Trademark Office*

In Column 26, Line 65, in Claim 15, delete "thereof" and insert -- thereof. --, therefor.

In Column 27, Line 3, in Claim 16, delete "thereof" and insert -- thereof. --, therefor.

In Column 28, Line 31, in Claim 24, delete "receive receiving" and insert -- receiving --, therefor.